United States Patent
Kurup et al.

(10) Patent No.: US 11,546,362 B2
(45) Date of Patent: Jan. 3, 2023

(54) SYSTEMS AND METHODS FOR DATA-DRIVEN INFRASTRUCTURE CONTROLS

(71) Applicant: JPMORGAN CHASE BANK, N.A., New York, NY (US)

(72) Inventors: Rejith G. Kurup, Morganville, NJ (US); Kanishka Hettiarachchi, Chatham, NJ (US); Vladimir Belinkis, Freehold, NJ (US); Ish K. Ahluwalia, East Brunswick, NJ (US); Ricky Hei Wong Chan, Woodside, NY (US); Dennis Joseph, San Jose, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 262 days.

(21) Appl. No.: 16/861,030

(22) Filed: Apr. 28, 2020

(65) Prior Publication Data
US 2020/0344253 A1 Oct. 29, 2020

Related U.S. Application Data

(60) Provisional application No. 62/839,842, filed on Apr. 29, 2019.

(51) Int. Cl.
*H04L 9/40* (2022.01)
*G06F 21/31* (2013.01)
*G06N 20/00* (2019.01)

(52) U.S. Cl.
CPC ........ *H04L 63/1425* (2013.01); *G06F 21/316* (2013.01); *G06N 20/00* (2019.01); *H04L 63/102* (2013.01); *H04L 63/1416* (2013.01)

(58) Field of Classification Search
CPC ............... H04L 63/1425; H04L 63/102; H04L 63/1416; H04L 9/40; G06F 21/316;
(Continued)

(56) References Cited

U.S. PATENT DOCUMENTS 10,650,928 B1 * 5/2020 Larson .................... G16H 50/70
11,151,479 B2 * 10/2021 Chu ........................ G06N 20/00
(Continued)

OTHER PUBLICATIONS

International Search Report, dated Aug. 24, 2020, from corresponding International Application No. PCT/US2020/030293.
(Continued)

*Primary Examiner* — Jayesh M Jhaveri
(74) *Attorney, Agent, or Firm* — Greenberg Traurig LLP (57) ABSTRACT

Systems and methods for data-driven infrastructure controls are disclosed. According to one embodiment, in an information processing apparatus comprising at least one computer processor, a computer-implemented method for automatically detecting anomalous user behavior within a unified entitlement framework may include: (1) receiving an access request for a technology asset from a user on a computing device, the access request comprising session data comprising one or more of user identification, user location, key strokes, and user computing device identification; (2) applying an entitlement-specific machine learning algorithm to the session data to generate an anomaly score; (3) storing the session data and associated anomaly score; (4) sending a review request to a manager; (5) receiving review results from the manager; and (6) updating the entitlement-specific machine learning algorithm based on the anomaly score and the review results from the manager.

20 Claims, 5 Drawing Sheets

(58) Field of Classification Search
CPC .......... G06F 21/31; G06F 21/55; G06F 21/62; G06N 20/00
See application file for complete search history.

(56) References Cited

U.S. PATENT DOCUMENTS

| | | | |
|---|---|---|---|
| 11,152,016 B2* | 10/2021 | Lawson | ................... G10L 15/22 |
| 2018/0219888 A1 | 8/2018 | Apostolopoulos | |
| 2018/0234442 A1 | 8/2018 | Luo et al. | |
| 2019/0065738 A1 | 2/2019 | Kim et al. | |
| 2019/0166141 A1* | 5/2019 | Xu | ........................ G06N 3/0454 |
| 2020/0285737 A1* | 9/2020 | Kraus | ................... G06F 21/552 |
| 2020/0356676 A1* | 11/2020 | Gorlamandala | ........ G06N 20/00 |
| 2021/0103837 A1* | 4/2021 | Shoemaker | .............. G06N 5/04 |
| 2022/0027447 A1* | 1/2022 | Keith, Jr. | ............ H04L 63/0421 |
| 2022/0075889 A1* | 3/2022 | Friedman | .............. G06F 21/604 |

OTHER PUBLICATIONS

Written Opinion of the International Searching Authority, dated Aug. 24, 2020, from corresponding International Application No. PCT/US2020/030293.

* cited by examiner

SYSTEMS AND METHODS FOR DATA-DRIVEN INFRASTRUCTURE CONTROLS

RELATED APPLICATIONS

This application claims priority to, and the benefit of U.S. Patent Application Ser. No. 62/839,842, filed Apr. 29, 2019, the disclosure of which is hereby incorporated, by reference, in its entirety.

BACKGROUND OF THE INVENTION

1. Field of the Invention

The present disclosure relates to systems and methods for data-driven infrastructure controls, and more particularly to automatically detecting user behavior within a unified entitlement framework and generating an anomaly score.

2. Description of the Related Art

Businesses often use technology access management systems to provision access among users within and outside of an organization. One common approach to such access management is a Role Based Access Control (RBAC), or "role-based," approach. Using RBAC, access is to systems is determined based on a user's role.

The RBAC approach, however, has scaling limitations in very large environments (e.g., in organizations with more than 10,000 technology assets). Drawbacks of the RBAC approach in large organizations include scale and complexity of job functions, frequent changes in organization structures, regulatory boundaries and constraints, technology asset inventory management, cyber security risks, and the complexity of transaction logging.

Moreover, a business may have internal or regulatory requirements to audit access to certain technology assets. A business may be required, for example, to inspect (via human review or otherwise) every instance of a user accessing certain technology assets. Inappropriate behavior may be detected and require corrective action. There may be thousands of instances of access per day, however, and having a human individually review each instance may be onerous and ineffective.

SUMMARY OF THE INVENTION

Systems and methods for data-driven infrastructure controls are disclosed. According to one embodiment, in an information processing apparatus comprising at least one computer processor, a computer-implemented method for automatically detecting anomalous user behavior within a unified entitlement framework may include: (1) receiving an access request for a technology asset from a user on a computing device, the access request comprising session data comprising one or more of user identification, user location, key strokes, and user computing device identification; (2) applying an entitlement-specific machine learning algorithm to the session data to generate an anomaly score; (3) storing the session data and associated anomaly score; (4) sending a review request to a manager; (5) receiving review results from the manager; and (6) updating the entitlement-specific machine learning algorithm based on the anomaly score and the review results from the manager.

In one embodiment, the method may further include receiving referential data associated with the access request. In one embodiment, the referential data may include at least one of an identification of an application service hosted on the computing device, a change or an incident for the access request, and information about the technology asset.

In one embodiment, the entitlement-specific machine learning algorithm is based on historical session information.

In one embodiment, the anomaly score may be higher in response to a first request to a technology asset.

In one embodiment, the anomaly score may be higher in response to a first request from a computing device.

In one embodiment, the method may further include denying access to the technology asset in response to the review results comprising a rejection.

In one embodiment, the method may further include granting access to the technology asset in response to the review results comprising an approval.

According to another embodiment, in a technology access management system comprising at least one computer processor, a method for automatically detecting a user behavior within a unified entitlement framework that may be automated may include: (1) receiving an access request for a technology asset from a user on a computing device, the access request comprising session data comprising one or more of user identification, user location, key strokes, and user computing device identification; (2) granting the access request; (3) recording session data for an access session to the technology asset by the user; (4) applying a machine learning algorithm using a machine learning model based on previously recorded or historical session data for the user to identify a repeatable or an automatable task; and (5) generating an alert that the identified task may be automated.

In one embodiment, the previously recorded or historical session data may include at least one of user keystrokes, a file accessed, and an application run.

In one embodiment, the previously recorded or historical session data may include previously recorded or historical session data for at least one other user.

In one embodiment, the repeatable or an automatable task may include a task that is performed repeatedly by the user another user.

In one embodiment, the repeatable or an automatable task may include restarting a service and sending logs.

In one embodiment, the method may further include automating the repeatable or an automatable task.

According to another embodiment, a computer-implemented system may include a computing device associated with a user; a server comprising at least one computer processor and executing a computer program; and a manager electronic device. The computing device may submit an access request for access a technology asset from a user, the access request comprising session data comprising one or more of user identification, user location, key strokes, and user computing device identification. The computer program may apply an entitlement-specific machine learning algorithm to the session data to generate an anomaly score; may store the session data and associated anomaly score; may send a review request to the manager electronic device with the anomaly score; may receive review results from the manager electronic device; and may update the entitlement-specific machine learning algorithm based on the anomaly score and the review results from the manager electronic device.

In one embodiment, the computer program may receive referential data associated with the access request. The referential data may include an identification of an application service hosted on the computing device, a change or an incident for the access request, information about the technology asset, combinations thereof, etc.

In one embodiment, the entitlement-specific machine learning algorithm may be based on historical session information.

In one embodiment, the anomaly score may be higher in response to a first request to a technology asset or in response to a first request from a computing device.

In one embodiment, access to the technology asset may be denied in response to the review results comprising a rejection.

In one embodiment, access to the technology asset may be granted in response to the review results comprising an approval.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Exemplary embodiments will now be described in order to illustrate various features. The embodiments described herein are not intended to be limiting as to the scope, but rather are intended to provide examples of the components, use, and operation of the invention.

Figure 1:
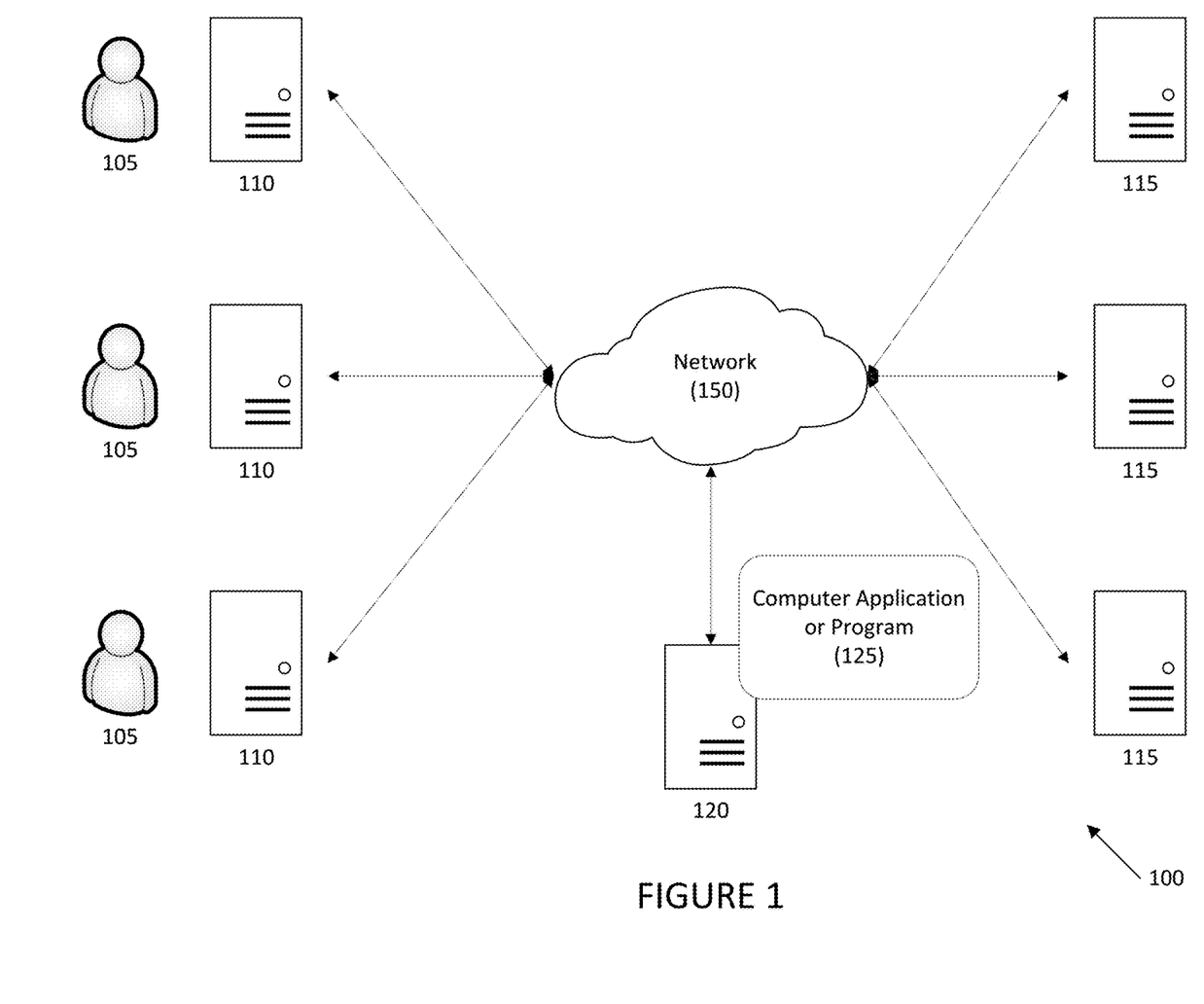
FIG. 1 depicts a system for automatically detecting anomalous user behavior within a unified entitlement framework according to an exemplary embodiment.

FIG. 1 depicts a system for automatically detecting anomalous user behavior within a unified entitlement framework according to an exemplary embodiment.

System 100 may include a plurality of user computing devices 110, each of which may be associated with one or more user 105. According to one embodiment, user computing devices 110 may be connected to one or more networks 150, which may be wide area networks, intranets, etc., or any other kind of network as desired. A plurality of technology assets 115 may also be connected to the one or more network 150. Technology assets 115 may include servers, computers, applications, operating systems, storage devices, data, programs or applications, etc.

Although each technology asset 115 is depicted as a single computing device, in practice, any number of technology assets as desired may be present on a single electronic device, may be distributed across multiple computing devices, etc.

System 100 may further include one or more technology access computing device 120 that executes technology access management system computer program or application 155. An example of a technology access management system computer program is disclosed in U.S. patent application Ser. No. 16/220,784, the disclosure of which is hereby incorporated, by reference, in its entirety. For example, technology entitlement assignments are disclosed as being automatically set "just in time" based on, for example, user identity, time, location, and host device.

Computing devices 110, 115, and 120 may be any suitable electronic device, including, for example, smartphones, smart watches, laptop computers, notebook computers, desktop computers, tablet computers, workstations, kiosks, terminals, Internet of Things (IoT) appliances, etc.

Technology access management application 125 may record full session data for each instance of access by user 105 of one or more technology asset 115. Technology access management application 125 may record information about the access of one or more technology asset 115, for example, time of access, user identification, device identification (e.g., an identifier associated with computing device 110 used), location of access by the user, etc. and any other session information as desired. Technology access management application 125 may further record what a user did in a session, for example keystrokes, files deleted, copied, accessed, edited, or applications run, etc., and any other session information as desired.

Figure 3:
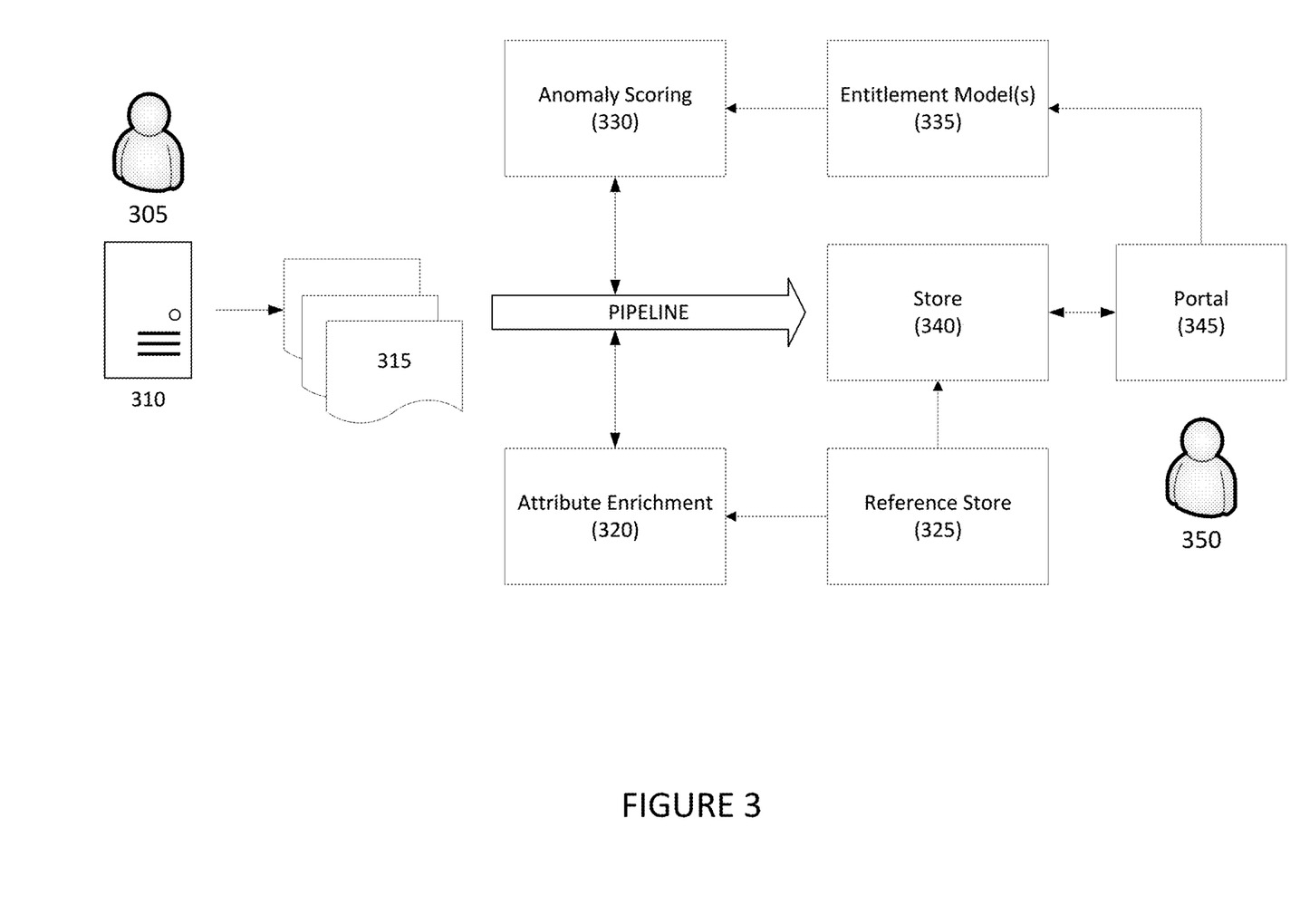
FIG. 3 depicts a process for automatic, entitlement-specific anomaly scoring of a privileged access session according to an exemplary embodiment.

According to one embodiment, user 105 may use computing device 110 to request access to one or more technology asset 115 from technology access computing device 120. Technology access computing device 120 may grant access and record full session data until the user is finished. Technology access computing device 120 may leverage an entitlement-specific machine learning model of user behavior to detect anomalous behavior for a particular session (for example as shown in FIG. 3 and accompanying description below).

Technology access computing device 120 may generate an anomaly score for the session based on the session data and the entitlement-specific machine learning model. Access during certain time periods or from certain locations or devices may weigh toward anomalous behavior. Based on the anomaly score, the user's access to one or more technology asset 115 may be denied or restricted, or an alert may be sent to other persons or systems to investigate.

Grouping data according to entitlement may assist in drawing out similarities that exist between different users 105 and different job functions. For example, users 105 with similar job functions may perform similar activities.

According to another embodiment, technology access computing program 125 may detect behavior during the session itself, for example, based on keystrokes, user identification, user location, user computing device, time, files that are being accessed, copied, and/or deleted, etc.

According to another embodiment, technology access computing program 125 may utilize data from multiple users or groups of users in building or updating entitlement-specific machine learning models of behavior to assist in detecting anomalies and driving automation.

According to one embodiment, technology access computing program 125 may save time by, for example, detecting repeated commands and alerting an automation team or a team that uses the entitlement to indicate that the activity that they are performing may be made into an automation micro service to be used in the future.

Figure 2:
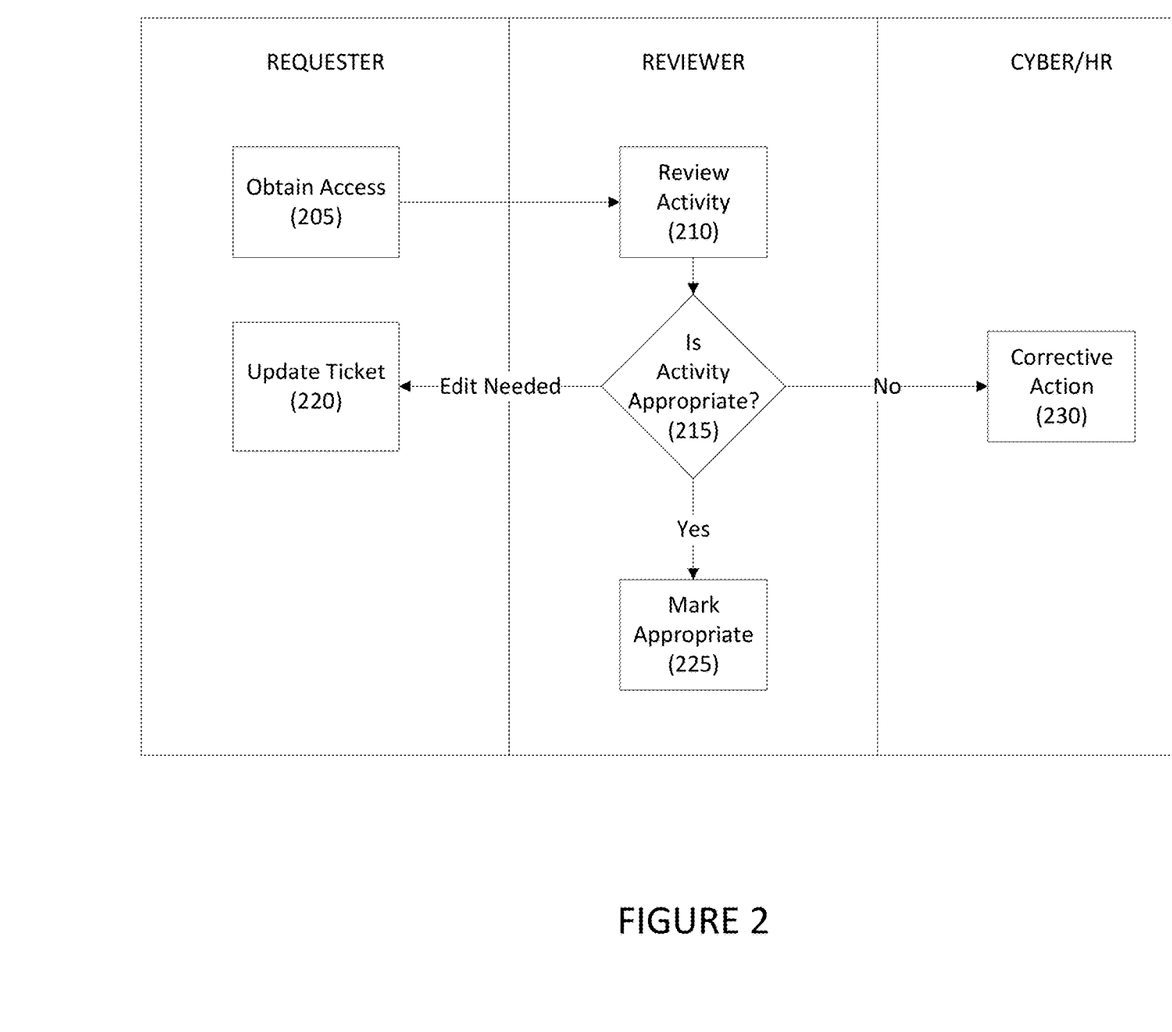
FIG. 2 depicts a method for reviewing activity performed during a privileged access session according to an exemplary embodiment.

FIG. 2 depicts a method for reviewing activity performed during a privileged access session according to an exemplary embodiment. The method of FIG. 2 may involve a requester, a reviewer, and/or an entity responsible for taking corrective action, such as cyber security or human resources individuals or a team at an organization.

In step 205, a requester (e.g., a privileged access user) may obtain brokered privileged access to a technology asset. An example of such is described in U.S. patent application Ser. No. 16/220,784.

In one embodiment, privileged session activity may be collected. The format and/or the content may be dependent on, for example, the platform on which the recording occurs. For example, a Unix™ platform may allow for text capture of stdin/out/err, while a Windows™ platform allows for recording, etc. The metadata for both, however, are equivalent and is dependent on reference data.

In step 210, a reviewer (e.g., a manager, supervisor, etc.) may review session data for the activity performed by the requester after the privileged session has been started.

According to one embodiment, a technology access computing device may apply an entitlement-specific machine learning model to the session data in order to generate an anomaly score for the user session. This will be discussed in greater detail, with regard to FIG. 3, below.

According to one embodiment, the reviewer may only review sessions with an anomaly score above a certain threshold.

In another embodiment, the automated system may further approve or deny sessions based on thresholds score thresholds. For example, a score may be received in the range of 0.00 to 1.00, and a threshold may be set (e.g., at 0.80) above which sessions are approved.

In step 215, the reviewer may determine whether the activity performed by the requester during the privileged session is appropriate, inappropriate, or if additional information is needed. For example, if the reviewer needs additional information or feedback from the requester, in step 220, the reviewer may request that the requester to update the request ticket with such information. The requester may then return the request ticket back to the reviewer with the requested information.

If the reviewer determines that the activity performed by the requester during the privileged session is appropriate, in step 225, the reviewer may indicate that the activity as appropriate in a review system.

For example, the reviewer may compare the activity to laws, rules, regulations, organizational policies, the reviewer's knowledge of the task for which access is requested, etc.

If the reviewer determines that the activity performed by the requester during the privileged session is inappropriate, such as not complying with laws, rules, regulations, organizational policies, etc., in step 230, the reviewer may notify an entity responsible for taking corrective action, such as security (e.g., cyber security), human resources, etc. at an organization. In one embodiment, the action taken may depend on the reason that the activity is inappropriate. Examples of actions may include suspending or limiting the requestor's access, informing the user's supervisor, annotating the requestor's performance appraisal, dismissing the requestor from the organization, etc.

In one embodiment, after the review is complete, the technology access computing device may feed the result of the review as an input to the entitlement-specific machine learning model as additional training data.

FIG. 3 depicts a process for entitlement-specific anomaly scoring of a privileged access session according to an exemplary embodiment.

A requester 305, for example a privileged access user, may obtain brokered privileged access to a technology asset 310, for example by using a technology access management system. An example of such a system is disclosed in U.S. patent application Ser. No. 16/220,784.

A log of the brokered privileged access may be recorded in log servers 315. The log may include, for example, keystrokes, user identification, user location, user computing device, and time, or which files are being accessed, copied, or deleted. From there, the log data may enter a real-time processing pipeline for attribute enrichment (320), anomaly scoring (330), and storage for further review (340).

In one embodiment, the log data may be combined with other information about what was accessed via attribute enrichment 320. For example, log data may be extracted, and other referential data about the privileged access session may be pulled from reference store 325 based on the log's contents. For example, data such as application services hosted on the device, the change or incident that lead to the reason for access, and other referential information about the server itself (for example the server's environment, location, operating system, etc.) may be collected from reference store 325 based on, for example, the resources accessed and the entitlement used in the access log.

The log data plus other referential data may then be processed for anomaly scoring 330. Anomaly scoring 330 may apply a machine learning algorithm to generate an anomaly score. The anomaly scoring step may use one of a number of different entitlement-specific machine learning models 335 depending on the entitlement or entitlements recorded in the log data.

According to one embodiment, the anomaly score may be a binary result. According to another embodiment, the anomaly score be provided as a number within a range (e.g., 0-10, 0-100, etc.) Other ways of presenting the anomaly score may be used as is necessary and/or desired.

According to one embodiment, different entitlement models 335 may include, for example, an "admin" model and an "application support" model based on admin entitlement and application support entitlement. According to one embodiment, a different entitlement model may be used for each class of entitlement.

Once the anomaly score is generated, the resulting score, the log data, and the other referential data may be sent to store 340 for further review by a reviewer. Reviewer 350 may access the data in store 340 via portal 345 and an electronic device (not shown). Reviewer 350 may review a particular privileged access session along with its anomaly score and other referential data, and may use this information in order to make a determination as to whether the user's actions were appropriate.

Referential information may include information that can be gathered about the person using requesting the privilege, or about asset on which the privilege is used. The type of referential information may vary depending on the organization and/or the asset. Examples of such information include, for example, is whether the access is covered by regional regulation, whether the asset can hold personal identifiable information (PII), etc.

According to one embodiment, the result of the review may be provided as an input to one or more entitlement-specific models 335 as additional training data for supervised machine learning. For example, if the reviewer marks as inappropriate a privileged access session that has a high anomaly score, the training model may use that data as a positive example. On the other hand, if the reviewer marks as appropriate a privileged access session that has a high anomaly score, the training model may use that data as a negative example. A feedback loop may therein be generated, in which the entitlement-specific models become better at detecting anomalous behavior with each iteration of review.

According to one embodiment, in order to assign a score to each session, a classification model (for example, Multinomial Naïve Bayes) may be first used for text classification. Other classifiers may be used as desired, for example logistic regression classifiers may be used.

Figure 4:
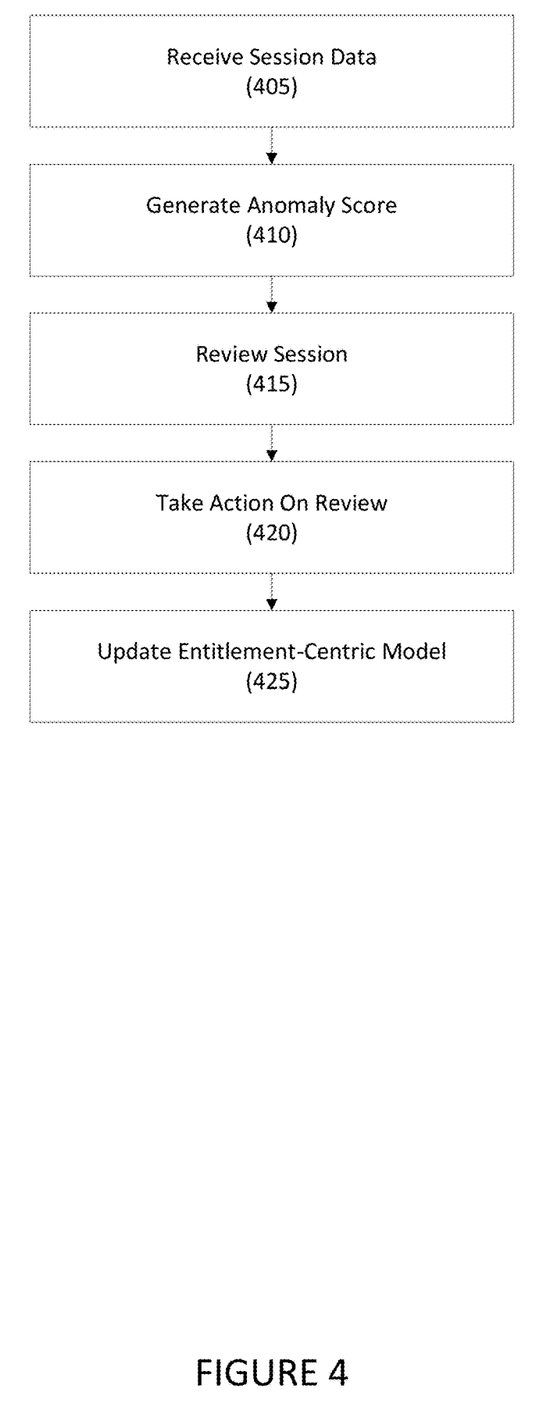
FIG. 4 depicts a method for automatically generating an anomaly score according to an exemplary embodiment.

FIG. 4 depicts a method for automatically detecting anomalous user behavior within a unified entitlement framework and taking appropriate action according to an exemplary embodiment.

In step 405, a technology access management system may receive an access request for a technology asset from a user on a computing device.

According to one embodiment, the technology access management system may collect some or all of keystrokes, user identification, user location, user computing device, and time. The technology access management system may also have access to historical session information from the same user, other users within the organization, other users within that user's business group, etc. and any other historical session information as desired.

According to one embodiment, the technology access management system may also have access to other referential data, such as application services hosted on the device, the change or incident that lead to the reason for access, and other referential information about the server itself (for example the server's environment, location, operating system, etc.).

At step 410, the technology access management system may apply a machine learning algorithm to the session information in order to generate an anomaly score.

According to one embodiment, the model may be based on historical session information. For example, a higher anomaly score may be generated when the user requests a technology asset outside of normal hours, at a new location, with a new device, etc.

According to one embodiment, the established model may be entitlement-specific. For example, there may be different models depending on the entitlement or entitlements used during the session.

According to one embodiment, the technology access management system may also use other referential data for the session or user as input to the machine learning algorithm.

In step 415, the technology access management system may wait for further review of the session data by, for example, a manager, supervisor, etc.

According to one embodiment, the technology access management system may generate an alert when a session is ready for review, for example in the form of an electronic message (e.g., email, SMS, in-app message, push message, etc.) to one or more systems or individuals, for example an individual in, for example, an IT department. The alert may include the anomaly score.

In step 420, the technology access management system may grant or deny access to the user depending on the result of the manager review. According to one embodiment, the user may be denied access until further authorized. Authorization may be required, for example, from another system or individual after reviewing the generated alert. According to one embodiment, limited access may be granted to the user until further authorization.

In step 425, the technology access management system may update its machine learning model with new data based on the result of the manager review.

According to one embodiment, the technology access management system may update an entitlement-specific model based on the result of the manager review.

Figure 5:
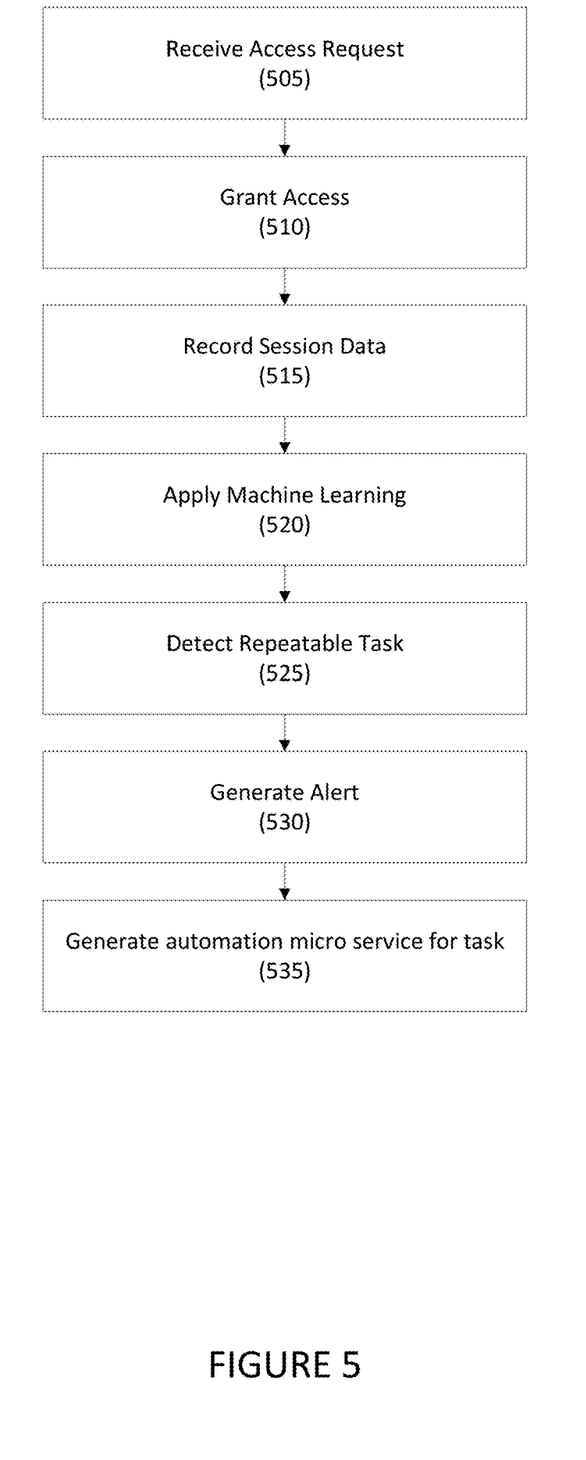
FIG. 5 depicts a method for automatically detecting a user behavior within a unified entitlement framework that may be automated according to an exemplary embodiment.

FIG. 5 depicts a method for automatically detecting a user behavior within a unified entitlement framework that may be automated according to an exemplary embodiment.

In step 505, a technology access management system may receive an access request to a technology asset from a user on a computing device. This may be similar to step 405 in FIG. 4, above.

In step 510, the technology access management system may grant the user access to the technology asset.

In step 515, the technology access management system may record session data for the user, including, for example, keystrokes, time of access, user identification, device identification, location of access by the user, files deleted, files copied, files accessed, files edited, or applications run, etc., and any other session information as necessary and/or desired.

In step 520, the technology access management system may apply a machine learning algorithm using a machine learning model based on previously recorded or historical session data for the user. In one embodiment, the historical session data may include session data for other users as well, for example other users within the user's group or business unit.

According to one embodiment, the machine learning model may be entitlement-specific.

According to one embodiment, the technology access management system may update the machine learning model based on current session data.

In step 525, the technology access management system may detect a repeatable or automatable task in the entitlement using the machine learning model. According to one embodiment, the repeatable or automatable task may be a task performed repeatedly by the current user or one performed repeatedly across multiple users using the entitlement. According to one embodiment, the repeated task may be restarting services on a computer device, sending logs to a predetermined destination, etc.

In step 530, the technology access management system may alert an automation team or a team that uses the entitlement to indicate that the task that is being performed may be made into an automated micro service to be used in the future. This may reduce the use of privileged access by automating the tasks that are being performed during the entitlement.

In step 535, the task may be automated. In one embodiment, as part of the automating process, testing may be performed to verify the automated task performs as desired.

Hereinafter, general aspects of implementation of the systems and methods of the embodiments will be described.

The system of the embodiments or portions of the system of the embodiments may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A computer-implemented method for automatically detecting anomalous user behavior within a unified entitlement framework, the method comprising the steps of:
   in an information processing apparatus comprising at least one computer processor:
      receiving an access request for a technology asset from a user on a computing device, the access request comprising session data comprising one or more of user identification, user location, key strokes, and user computing device identification;
      applying an entitlement-specific machine learning algorithm to the session data to generate an anomaly score, the entitlement-specific machine learning algorithm based on an entitlement class of the access request;
      storing the session data and the associated anomaly score;
      sending a review request comprising session activity data associated with the session data to a manager;
      receiving review results, in response to the review request, from the manager; and
      updating the entitlement-specific machine learning algorithm based on the anomaly score and the review results from the manager.

2. The method of claim 1, further comprising:
   receiving referential data associated with the access request.

3. The method of claim 2, wherein the referential data comprises at least one of an identification of an application service hosted on the computing device, a change or an incident for the access request, and information about the technology asset.

4. The method of claim 1, wherein the entitlement-specific machine learning algorithm is based on historical session information.

5. The method of claim 1, wherein the anomaly score is higher in response to a first request to a technology asset.

6. The method of claim 1, wherein the anomaly score is higher in response to a first request from a computing device.

7. The method of claim 1, further comprising:
   denying access to the technology asset in response to the review results comprising a rejection.

8. The method of claim 1, further comprising:
   granting access to the technology asset in response to the review results comprising an approval.

9. A method for automatically detecting a user behavior within a unified entitlement framework that may be automated, comprising:
   in a technology access management system comprising at least one computer processor:
      receiving an access request for a technology asset from a user on a computing device, the access request comprising session data comprising one or more of user identification, user location, key strokes, and user computing device identification;

granting the access request;

recording session data for an access session to the technology asset by the user;

applying a machine learning algorithm using a machine learning model based on previously recorded or historical session data for the user to identify a repeatable or an automatable task in an entitlement associated with the access request; and generating an alert that the identified task may be automated.

10. The method of claim 9, wherein the previously recorded or historical session data comprises at least one of user keystrokes, a file accessed, and an application run.

11. The method of claim 9, wherein the previously recorded or historical session data comprises previously recorded or historical session data for at least one other user.

12. The method of claim 9, wherein the repeatable or the automatable task comprises a task that is performed repeatedly by the user or another user.

13. The method of claim 12, wherein the repeatable or the automatable task comprises restarting a service and sending logs.

14. The method of claim 9, further comprising: automating the repeatable or the automatable task.

15. A computer-implemented system, comprising:

a computing device associated with a user;

a server comprising at least one computer processor and executing a computer program; and a manager electronic device;

wherein:

the computing device submits an access request to access a technology asset from a user, the access request comprising session data comprising one or more of user identification, user location, key strokes, and user computing device identification;

the computer program applies an entitlement-specific machine learning algorithm to the session data to generate an anomaly score, the entitlement-specific machine learning algorithm based on an entitlement class of the access request;

the computer program stores the session data and the associated anomaly score;

the computer program sends a review request comprising session activity data associated with the session data to the manager electronic device with the anomaly score;

the computer program receives review results, in response to the review request, from the manager electronic device; and the computer program updates the entitlement-specific machine learning algorithm based on the anomaly score and the review results from the manager electronic device.

16. The system of claim 15, the computer program may receive referential data associated with the access request, wherein the referential data comprises at least one of an identification of an application service hosted on the computing device, a change or an incident for the access request, and information about the technology asset.

17. The system of claim 15, wherein the entitlement-specific machine learning algorithm is based on historical session information.

18. The system of claim 15, wherein the anomaly score is higher in response to a first request to a technology asset or in response to a first request from a computing device.

19. The system of claim 15, wherein access to the technology asset is denied in response to the review results comprising a rejection.

20. The system of claim 15, wherein access to the technology asset is granted in response to the review results comprising an approval.

* * * * *